3,357,538
APPARATUS FOR FEEDING AND ORIENTING PEAR-SHAPED ARTICLES

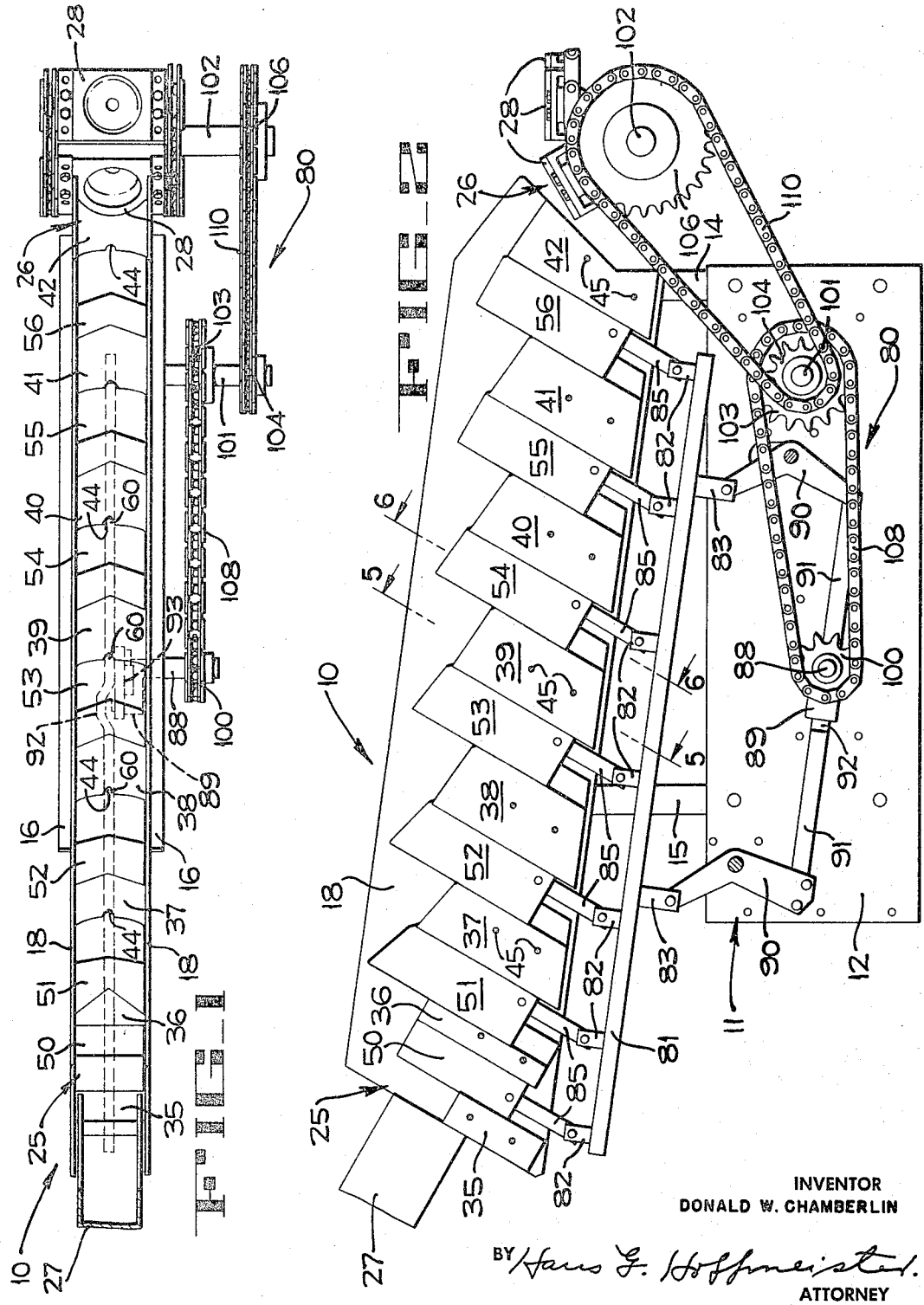

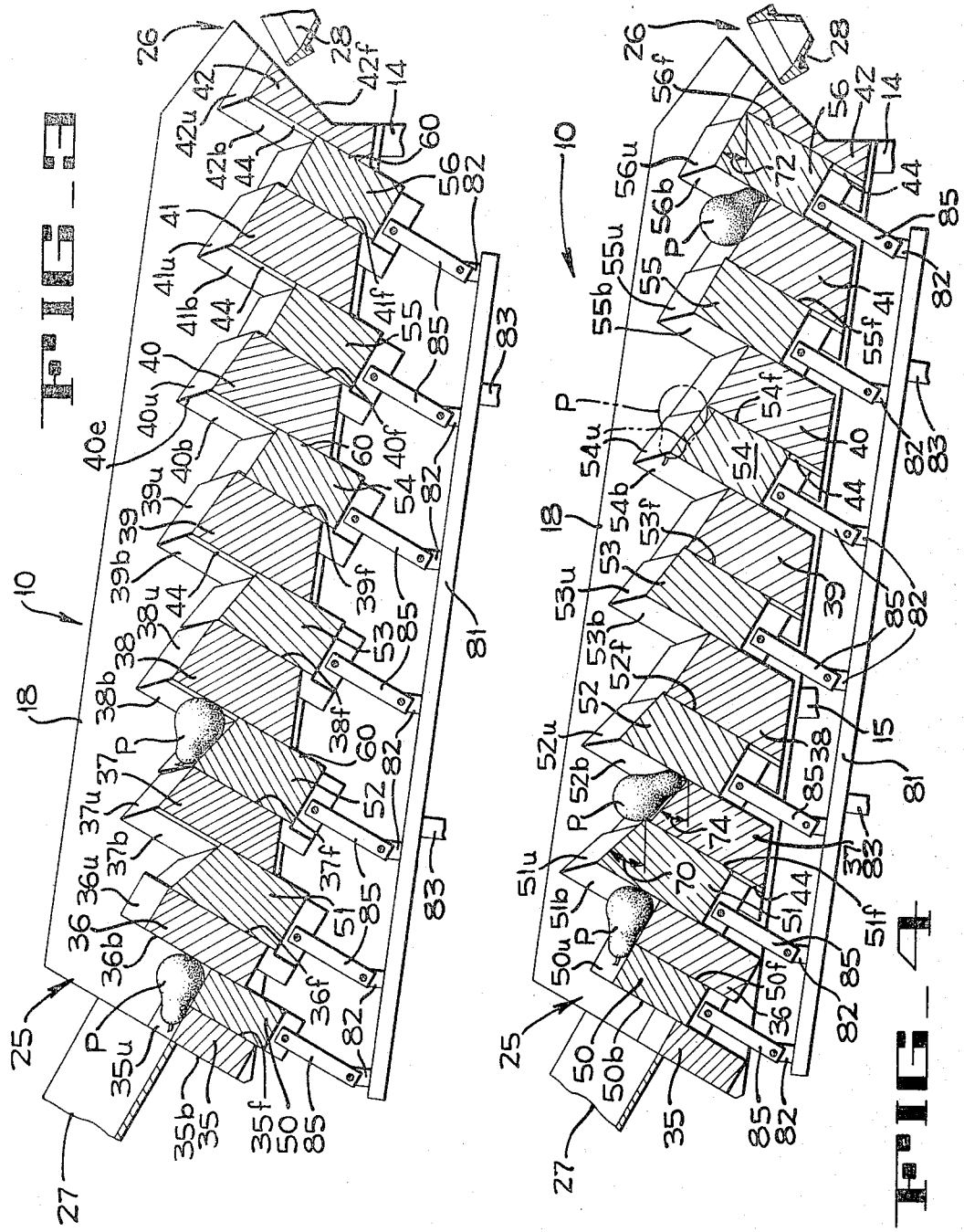

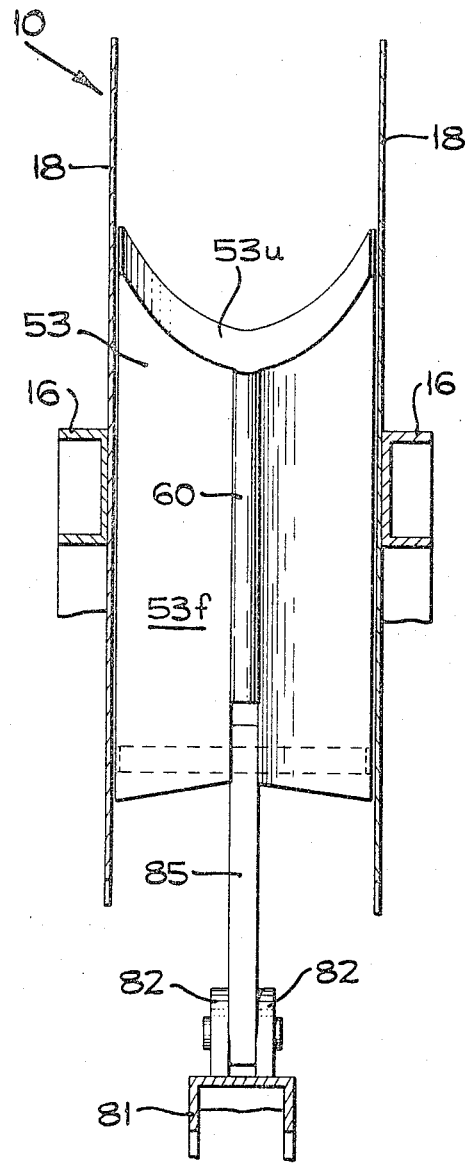
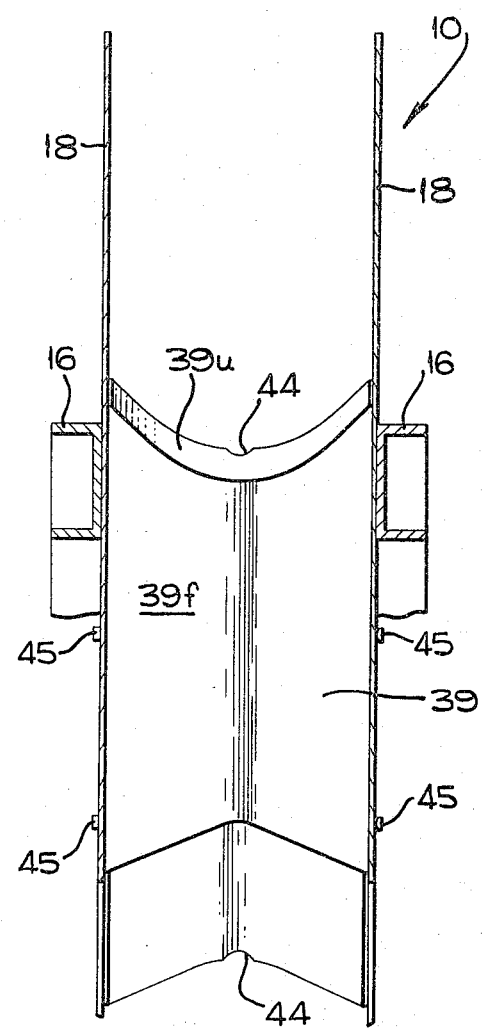

Donald W. Chamberlin, Los Gatos, Calif., assignor to FMC Corporation, San Jose, Calif., a corporation of Delaware
Filed June 8, 1964, Ser. No. 373,460
11 Claims. (Cl. 198—33)

The present invention pertains to an apparatus for feeding and orienting pear-shaped articles and more particularly to an apparatus which receives randomly oriented pears of various sizes and successively discharges them nose-end first.

In order to can fresh pears for market, it is desirable to convey the fruit along a processing line while certain operations are performed on the fruit. One or more of these operations may require that the fruit be in a certain attitude as it travels along the line. Thus, it may be necessary individually to insert pears, nose or stem end down, into the cups of a conveyor which then carries the pears through a stemming and coring apparatus.

Proper orientation of pears thus requires positioning of their stem-blossom axes in alignment with their path of travel and positioning of their stem-ends or noses forward. Of course, an orienting and feeding apparatus must be capable of accepting pears that are randomly oriented and effecting and maintaining said positioning while simultaneously arranging and moving the pears in timed sequence along the conveying line.

An object of the present invention is to provide an improved apparatus for feeding and orienting pears or other pear-shaped articles.

Another object is to provide an apparatus which receives randomly oriented pear-shaped articles of various sizes and successively discharges them nose-end first.

Another object is to provide a feeding and orienting apparatus which is capable of discharging all of the articles nose-end first even though the articles range in size from those which are relatively long and slender to those which are relatively short and stubby.

Another object is to provide a feeding and orienting apparatus which orients pear-shaped articles by utilizing the inherent characteristic of such articles to roll over when on a sloping surface of predetermined declination.

These, together with other objects, will become apparent upon reference to the following description and accompanying drawings, in which:

FIGURE 1 is a plan of an apparatus embodying the present invention.

FIGURE 2 is a side elevation of the apparatus shown in FIG. 1 but with the side panel removed.

FIGURE 3 is a longitudinal section of a portion of the apparatus shown in FIG. 1, and wherein the movable shuffles are in a lower position, it being noted that pears are shown at various positions on the apparatus.

FIGURE 4 is a view similar to FIG. 3 but with the movable shuffles in an upper position.

FIGURE 5 is an enlarged fragmentary section taken on line 5—5 in FIG. 2.

FIGURE 6 is an enlarged fragmentary section taken on line 6—6 in FIG. 2.

Referring more particularly to the drawings, the feeding and orienting apparatus of the present invention is generally identified by the numeral 10. The apparatus includes a support frame 11 having a base 12 (FIG. 2), front and rear legs 14 and 15 projecting upward from the base, forwardly declined side channels 16 mounted on and extending between legs on opposite sides of the apparatus, and vertical side panels 18 supported in spaced parallel relation to each other by the channels.

The apparatus 10 has a rear input end 25 and a forward discharge end 26. A forwardly declined feed chute 27 is supported so as to feed pears P in random orientation into the input end of the apparatus whereupon the latter feeds the pears along a path between the side panels 18 toward the discharge end and orients the pears during such travel so as to discharge them nose-end first. A cup 28, which may constitute part of a conveyor, not shown, is illustrated in the drawings as being located adjacent to the discharge end of the apparatus for receiving pears discharged therefrom.

The feeding and orienting apparatus 10 also includes a stationary feeding shuffle 35, a stationary converting shuffle 36, a plurality of stationary orienting shuffles 37, 38, 39, 40 and 41, and a stationary discharging shuffle 42. The feeding shuffle has flat front and back surfaces 35$f$ and 35$b$ and a concave upper surface 35$u$. The converting shuffle has a flat back surface 36$b$, a convex front surface 36$f$, and a concave upper surface 36$u$. Each of the orienting shuffles have a concave back surface 37$b$–41$b$, a convex front surface 37$f$–41$f$, and a concave upper surface 37$u$–41$u$. Still further, the discharging shuffle has a concave back surface 42$b$, a V-shaped front surface 42$f$, and a concave upper surface 42$u$. The back surfaces of the orienting and discharging shuffles have central grooves extending lengthwise of their respective surfaces, as indicated by the number 44 in FIGS. 3, 4 and 6. The stationary shuffles are securely mounted between and on the side panels 18 by screws 45. As best illustrated in FIGS. 2–4, these stationary shuffles are parallel and spaced lengthwise of the apparatus and have their upper surfaces forwardly declined. Preferably, the stationary shuffles are also forwardly inclined and progressively stepped downward from the rear input end 25 to forward discharge end 26.

The subject apparatus 11 also includes a movable feeding shuffle 50 slidably fitted between the feeding and converting shuffles 35 and 36 and a plurality of movable orienting shuffles 51, 52, 53, 54, 55 and 56, individually slidably fitted between the converting, orienting and discharging shuffles 36–42 in the manner illustrated in the drawings. The movable feeding shuffle has a flat back surface 50$b$ coterminus with the rear edges of the side panel 18, a flat front surface 50$f$ and a concave upper surface 50$u$. The movable orienting shuffles have concave back surfaces 51$b$–56$b$, convex front surfaces 51$f$–56$f$, and concave upper surfaces 51$u$–56$u$. The front surfaces of the movable orienting shuffles are provided with lengthwise ribs 60 which slidably fit in the grooves 44 of their immediately forwardly adjacent stationary shuffles 37–42. Furthermore, it is to be noted that the convex front surfaces 36$f$–41$f$ of the stationary shuffles 36–41 complementarily fit against the concave back surfaces 51$b$–56$b$ of the movable shuffles 51–56. Like the stationary shuffles, the movable shuffles are forwardly inclined and progressively forwardly stepped down.

A significant feature of the present invention is the declination of the upper surfaces 35$u$–42$u$ and 50$u$–56$u$ of the stationary and movable shuffles 35–42 and 50–56. The purpose of this declination is to cause the pears P which are disposed on these upper surfaces with their butt ends first to roll over so that their nose-ends are first, that is, pointed forward. In order to accomplish this roll-over task effectively, it is necessary to provide predetermined angles of declination on these upper surfaces; that is, certain sizes of pears may roll over, from butt end forward to nose-end forward on an upper surface of a certain declination, whereas they merely slide and do not roll over on another surface of different declination. The proper angle of declination is a function of several factors including the location of the center of gravity of the pear P with respect to the lowermost point of contact of the pear with the upper surface, this relationship depending on the size and shape of the pear; and the friction between the pear and the upper surface, this factor being affected, of course, by whether or not the skin has been removed from the pear. According to the present invention, the angle of declination 70 (FIG. 4) of the rearmost movable orientating shuffle 51 should be approximately fifty dregrees and the angle of declination 72 of the forwardmost movable orienting shuffle 56 should be approximately thirty degrees. The angle of declination of the intermediate movable orienting shuffles 52–55 are respectively forty-five degrees, forty degrees, thirty-five degrees, and thirty degrees. It is thus evident that the angles of declination of the upper surfaces of the movable shuffles progressively decrease from a maximum angle 70 to a minimum angle 72. On the relatively steep upper surface 51u, the longest, slenderest pears P which will ordinarily be handled in the subject apparatus will roll over from butt-end forward to nose-end forward and then slide with their nose-ends remaining forward. On this steepest surface, however, the stubbiest pears P tumble, that is roll end-over-end-over-end on such a steep slope so that after completing their movement on this slope, their butt ends may still be pointing forward. It is for this reason that the more gradual slope of the upper surface 56u is provided. On this upper surface of minimum declination, the longest and slenderest pears slide no matter whether their nose-ends or butt-ends are directed forward; however, the shortest, stubbiest pears expected to be handled by the apparatus 10 will roll over from butt-end forward to nose-end forward and then slide, so that upon completion of their travel, their nose-ends are directed forward. Therefore, the forwardmost and rearwardmost movable orienting shuffles are intended to handle the extremes of the sizes of the pears to be processed, whereas pears of intermediate sizes are oriented by the intermediate movable orienting shuffles 52–55.

The upper surfaces 37u–42u of the stationary shuffles 37–42 are sloped somewhat in conformity with the slopes of the upper surfaces 51u–56u of the movable shuffles 51–56. Preferably, the angle of declination of each upper surface on the stationary orienting shuffles 37–41 is aproximately equal to the angle of the declination of the movable shuffle immediately forwardly adjacent thereto. For example, the angle indicated by the number 74 is preferably approximately forty-five degrees, it being noted that this is the same angle as preferably employed on the upper surface 52u of the shuffle 52 which is forwardly adjacent to the stationary shuffle 37.

Reciprocating up and down motion is imparted to the movable shuffles 50–56 by a driving mechanism, generally identified by the number 80 in FIGS. 1 and 2. This mechanism includes a tie bar 81 having a plurality of spaced upper ears 82 and a pair of spaced lower ears 83. Links 85 individually pivotally interconnect the upper ears and the movable shuffles. Further, a crankshaft 88 is journaled in the base 12 and is provided with a main crank 89. Bellcranks 90 are also pivoted on the base and have upper ends individually pivoted to the lower ears 83 and downwardly projecting lower end. A connecting rod 91 pivotally interconnects the lower ends of the bellcranks and has an intermediate offset 92 for accommodating relative movement between the main crank and the connecting rod. A link 93 pivotally interconnects the main crank and the connecting rod so that rotation of the crankshaft effects rocking movement of the bellcranks and consequent unitary elevational movement of the movable shuffles between upper and lower positions respectively illustrated in FIGS. 4 and 3. In their upper positions, the upper surfaces 50u–56u are in substantial alignment with their forwardly adjacent upper surfaces 36u–42u. In the lower position of the movable shuffles, the upper surfaces 35u–41u are individually substantially aligned with the forwardly adjacent upper surfaces 50u–56u. An important characteristic of this drive mechanism is its ability to retard movement of the movable shuffles 50–56 as they approach and reach the upper ends of their strokes so as to allow pears lifted thereby to roll over onto the stationary shuffles, instead of falling and being thrown thereon.

The driving mechanism 80 also includes a driven sprocket 100 secured to the crankshaft 88, intermediate and main shafts 101 and 102, drive and driven sprockets 103 and 104 on the intermediate shaft 101, a drive sprocket 106 on the main shaft 102, a chain 108 trained around the driven sprocket 100 and the drive sprocket 103, and a chain 110 trained around the drive sprocket 106 and the driven sprocket 104.

In summarizing the operation of the present apparatus 10, the main shaft 102 is driven by a suitable power source, not shown, in order to reciprocate the movable shuffles 50–56 between their upper and lower positions, and pears P are delivered to the apparatus in the feed chute 27. The pears are singulated by the feeding shuffles 35 and 50 and oriented so that their stem-blossom axes are longitudinally aligned with the path of travel of the pears through the apparatus. However, a pear may slide down the upper surfaces 35u and 50u and against the rear surface 36b with either its butt-end or its nose-end forward. The pear on shuffles 35 and 50 (FIG. 3) illustrates this butt-end forward condition, and since it is desired to discharge each pear into the cup 28 with its stem or nose-end first, it is necessary to orient such a pear so that its nose-end will be directed forward. Thus, on the next upward stroke of the movable shuffles, the pear is lifted and, when the movable shuffles are in their upper position, the pear slides from the upper surface 50u onto the upper surface 36u of the stationary shuffle 36 and abuts the back surface 51b of the movable shuffle 51. The angle of declination of the upper surfaces 50u and 36u is not depended on to orient the pears, although they may be oriented in some instances. On the next downward stroke of the movable shuffles, the pear moves from the upper surface 36u onto the upper surface 51u of the movable shuffle 51; let it be assumed that the pear is the longest and slenderest pear to be processed and that at this location along the path its butt-end is foremost. On the next upward stroke of the movable shuffles, the pear rolls over (FIG. 4) from its position on surface 51u into a nose-end forward position on surface 37u and continues sliding forward until its nose-end strikes the back surface 52b of the movable shuffle 52. This pear will continue from shuffle to shuffle in the manner previously described, being successively raised by the movable shuffles, then sliding from each movable shuffle to the following stationary shuffle, and then sliding from each stationary shuffle to the following movable shuffle. The important point to note is that once this longest and thinnest pear has been turned over so that its nose-end is forward, it then continues to slide and does not turn over again. The result is that this pear is discharged with its nose-end down into the cup 28.

Returning now to a consideration of each pear after it has moved into a position onto surface 51u. Let it now be assumed that the pear is the stubbiest pear to be processed and that its butt-end is foremost. On the next upward stroke of the movable shuffles 50–56, this pear not only turns over so that its nose-end is forward but continues to tumble over and over so that when it finally comes to rest against the back surface 52b, it may still have its butt-end directed forward. This tumbling action continues as this stubbiest pear moves from shuffle to shuffle until it rests on the upper surface 55u of shuffle 55. Here, as will be recalled, the slope is relatively gradual so that if this stubbiest pear has its butt-end foremost, it will roll over once until its stem end is directed forward; thereafter, this pear will slide forward into contact with surface 56b and will eventually be discharged into the cup 28 with its stem end down.

If the pear P on the upper surface 51u is intermediate the sizes described above, it may not be oriented by the shuffles 51 or 55 and, if not, the intermediate shuffles 52–54 will effect the orientation.

As above stated, one of the factors which cause the pears to roll over is the friction between the pear and the upper surfaces 35u–42u or 50u–56u of the shuffles 35–42 or 50–56, respectively. As will be recognized, this friction is less than peeled or relatively more slippery fruit than it is with fruit which has not been peeled or which is relatively dry. The subject invention provides a feature which enhances the friction force and which is particularly useful when the apparatus is handling slippery fruit. This feature is best explained by reference to FIG. 4 wherein the upper surface 54u of the movable shuffle 54 is shown in phantom line, just before it reaches the uppermost limit of its upper stroke. In this position, the upper surface 54u is not yet in alignment with the upper surface 40u so that the rear upper edge 40e defines an abutment which is engaged by a pear P (phantom line) carried by the movable shuffle 54. If this pear is of such a size and shape that its center of gravity is located forward of the edge 40e, this pear will start to roll over before the upper 54u is actually aligned with the upper surface 40u, notwithstanding the slipperiness of the pear. Although the abutment has been illustrated and described in connection with the shuffles 40 and 54, it is to be understood that a similar abutment is formed between each adjacent pair of shuffles in the apparatus.

Another feature that should be noted is that the angle between each back surface, as 52b, and each upper surface, as 37u, should preferably be no greater than about ninety degrees in order to prevent the pears P from sliding upward along the back surfaces when they strike the same subsequent to their descent along the preceding upper surfaces, as 51u and 37u in the example given.

From the foregoing, it will be evident that an apparatus for feeding and orienting pears or pear-shaped articles has been provided. The apparatus is capable of receiving randomly oriented pear-shaped articles of various sizes and then successively discharging them in timed relation with their nose-ends first. The apparatus takes particular advantage of the characteristic of pear-shaped articles to roll over or slide depending on the relationship of their center of gravity to the point of contact of the supporting surface as well as the friction between the supporting surface and the article. Furthermore, the apparatus is particularly significant in that it is capable of orienting articles of various sizes within a range from relatively long and thin articles having their centers of gravity relatively toward the nose ends thereof and relatively stubby articles having their centers of gravity closer to their butt-ends.

Although a preferred embodiment of the present invention has been shown and described, it will be understood that various changes and modifications may be made in the details thereof without departing from the spirit and the scope of the appended claims.

Having thus described the invention, what is claimed as new and desired to be secured by Letters Patent is as follows:

1. In an apparatus for orienting articles while moving them in a predetermined forward direction along a path, a plurality of shuffles having upper surfaces, and means mounting said shuffles along said path with their upper surfaces forwardly declined, each of said forwardly declined upper surfaces having a predetermined angle of declination relative to a horizontal, the angle of declination of the forwardly declined upper surface of a first shuffle being different from the angle of declination of the forwardly declined upper surface of a shuffle located forwardly of said first shuffle, said mounting means mounting certain of said shuffles for elevational movement with respect to the other of said shuffles between alternate positions with the upper surface of each shuffle being alternately aligned with the upper surfaces of the shuffles immediately adjacent thereto, upper surfaces of adjacent shuffles constituting means permitting said articles to roll over when said surfaces are in alignment.

2. In an apparatus for shuffle-feeding pears of various sizes in a predetermined forward direction along a path and for orienting each pear so that its nose points in said forward direction, a support, a plurality of forwardly inclined stationary shuffles mounted in said support and in spaced parallel relation to each other along said path, said stationary shuffles having forwardly declined upper surfaces, a plurality of movable shuffles individually slidably fitted between the stationary shuffles and also having forwardly declined upper surfaces, and means for moving said movable shuffles in unison between first positions with their upper surfaces substantially in alignment with their respectively forwardly adjacent stationary shuffles and second positions with their upper surfaces substantially in alignment with their respectively rearwardly adjacent stationary shuffles, said movable shuffles being stepped downward with respect to each other in said forward direction and said stationary shuffles being stepped downward with respect to each other in said forward direction.

3. In an apparatus for shuffle-feeding articles in a predetermined forward direction along a path, a plurality of shuffles having upper surfaces, and means mounting the shuffles along said path with their upper surfaces forwardly declined, the slope of said upper surfaces progressively decreasing in said forward direction, said means mounting a group of said shuffles for elevational movement relative to another group of said shuffles.

4. In an apparatus for shuffle-feeding pears of various sizes in a predetermined forward direction along a path and for orienting each pear so that its nose points in said forward direction, a support, a plurality of stationary shuffles mounted in said support and in spaced relation to each other along said path, said stationary shuffles having forwardly declined upper surfaces, a plurality of movable shuffles individually slidably fitted between the stationary shuffles and also having forwardly declined upper surfaces, the angle of declination of said upper surfaces of the movable shuffles progressively decreasing in said forward direction, and means for moving said movable shuffles in unison between first positions with their upper surfaces substantially in alignment with their respectively forwardly adjacent stationary shuffles and second positions with their upper surfaces substantially in alignment with their respectively rearwardly adjacent stationary shuffles.

5. The apparatus of claim 4 wherein said angle of declination progressively decreases from approximately 50° to approximately 30°.

6. The apparatus of claim 4 wherein the angle of declination of each stationary shuffle is approximately the same as said angle of the movable shuffle immediately forwardly adjacent thereto.

7. The apparatus of claim 4 wherein said moving means retards the movement of said movable shuffles as they approach and arrive at said first position in order to facilitate movement of pears on the upper surfaces of the movable shuffles onto the upper surfaces of the stationary shuffles.

8. The apparatus of claim 4 wherein each upper surface has a length measured along said path, and wherein the combined length of each movable shuffle and its respective forwardly adjacent stationary shuffle is greater than the length of the longest pear to be handled in said apparatus.

9. The apparatus of claim 4 wherein said upper surfaces are transversely concave.

10. The apparatus of claim 9 wherein the maximum transverse dimension of each of said upper surfaces is less than the length of the longest pear to be handled in said apparatus whereby the stem blossom axis of each pear is aligned with said path.

11. The apparatus of claim 4 wherein each shuffle has a forward convex surface and a rearward concave surface, and wherein the forward surfaces of movable shuffles fit in the rearward surface of their forwardly adjacent stationary shuffles, and wherein the forward surfaces of stationary shuffles complementarily fit against the rearward surface of their respectively forwardly adjacent movable shuffles.

References Cited

UNITED STATES PATENTS

| | | | |
|---|---|---|---|
| 816,323 | 6/1906 | Hellstrom | 198—219 |
| 2,728,443 | 12/1955 | Pike | 198—219 X |
| 3,151,729 | 10/1964 | Gardiner | 198—33 |

EDWARD A. SROKA, *Primary Examiner.*